US012572871B2

(12) United States Patent
Boxell et al.

(10) Patent No.: US 12,572,871 B2
(45) Date of Patent: Mar. 10, 2026

(54) HETEROGENEOUS TREATMENT PREDICTION MODEL FOR GENERATING USER EMBEDDINGS

(71) Applicant: Maplebear Inc., San Francisco, CA (US)

(72) Inventors: Levi Boxell, Brownsburg, IN (US); Rustin Partow, San Francisco, CA (US); Tilman Drerup, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 46 days.

(21) Appl. No.: 18/228,669

(22) Filed: Jul. 31, 2023

(65) Prior Publication Data

US 2025/0045673 A1     Feb. 6, 2025

(51) Int. Cl.
*G06Q 10/06* (2023.01)
*G06Q 10/0637* (2023.01)
*G06Q 10/0639* (2023.01)

(52) U.S. Cl.
CPC ... *G06Q 10/06375* (2013.01); *G06Q 10/0639* (2013.01)

(58) Field of Classification Search
CPC .................................................. G06Q 10/06
See application file for complete search history.

(56) References Cited

U.S. PATENT DOCUMENTS

| | | | |
|---|---|---|---|
| 2019/0251476 A1* | 8/2019 | Shiebler | G06N 3/0499 |
| 2020/0107072 A1* | 4/2020 | Lomada | G06N 3/08 |
| 2020/0245009 A1* | 7/2020 | Saini | H04N 21/23614 |
| 2020/0381096 A1* | 12/2020 | Zaharchuk | G06V 10/776 |
| 2021/0365965 A1* | 11/2021 | Shrivastava | G06Q 30/0201 |
| 2022/0188850 A1* | 6/2022 | Costabello | G06Q 30/0205 |
| 2023/0111605 A1* | 4/2023 | Wilson | G16H 10/60 |
| | | | 706/11 |
| 2023/0177582 A1* | 6/2023 | Dwivedi | G06Q 30/0641 |
| | | | 705/26.7 |
| 2024/0005377 A1* | 1/2024 | Chen | G06Q 30/0222 |
| 2024/0403623 A1* | 12/2024 | Mohamed Halim | G06N 3/047 |

* cited by examiner

*Primary Examiner* — Nga B Nguyen
(74) *Attorney, Agent, or Firm* — Fenwick & West LLP

(57) ABSTRACT

An embedding model is trained to learn latent representations of users describing information related to conditional treatment effect for users relative to different potential treatments. The user embeddings may be used to determine the types of situations in which a user responds differently to different conditions or situations. To train this model, a plurality of experiments with users may be performed to determine user responses to different treatment conditions in the experiments. The conditional treatment effect for users in the experiments may be determined, e.g., with counterfactual predictions of a treatment not experienced by a user in the experiment. The embedding model may be trained with decoders that each predict the conditional treatment effect with respect to one of the experiments, enabling a loss for each experiment with respect to the conditional treatment effect to jointly train the embedding model.

20 Claims, 5 Drawing Sheets

HETEROGENEOUS TREATMENT PREDICTION MODEL FOR GENERATING USER EMBEDDINGS

BACKGROUND

Computer models may represent users with user embeddings, which are compact representations of a user that may be learned based on a user's interactions with a system or a user's features. In general, such user embeddings are trained for specific applications, such as a user's interactions with a particular type of item, or to predict a user's response to a particular change in how a system operates. User embeddings trained for specific applications often introduce challenges in requiring significant training time or training data to effectively represent users, and such user embeddings are typically specific to a particular application and may not be effectively re-used in other applications without further training.

In addition, modern systems may often vary aspects of the systems to perform different types of testing or experiments to determine how variations affect user choices and other behavior. Such experiments may give one group of users a particular treatment and another group of users a different treatment to determine the effectiveness of the treatment for the users. Typically, users in the experiment only actually experienced only one of the possible results of the experiment, such that user reactions to other treatments are predicted as a counterfactual. In addition, when models predict outcomes for a user, such models may typically estimate the specific outcome values for a user (e.g., answering the question: "for this user, what is the likely value of an outcome in a particular category"). These predictions, when made with the types of user embeddings discussed above, may be useful in accurately predicting a user's outcome for a particular experimental treatment, but may not provide a user embedding that is generally useful for other models or that predicts, more generally, the extent to which a change in experimental treatment affects one user more than another user.

As one example of systems in which these experiments may be performed, an online concierge system may comprise an online computer system by which users can order items to be provided to them. Some online concierge systems use sophisticated algorithms and machine learning models to determine which items to present to a user who is selecting items to order. Over time, these algorithms and models may be changed when a new feature is added to the online concierge system. For example, a new feature may be a new algorithm or model to be used by the online concierge system to select items to present to users, or a new feature may be one or more new parameters for existing algorithms or models. New features may also include different user interface flows or elements that present items with different frequencies and in different ways. With sophisticated systems like online concierge systems, it can be difficult to predict how these new features will impact user interactions with items. As one way of evaluating the effect of modifying features, the online concierge system may perform experiments in which different features are evaluated as different variants or "treatments" in an experiment. The variants typically include at least a control variant indicating the current way the system provides features, and a test variant with a modification (e.g., of the new or modified feature). This may be intended to provide an A/B comparison of the effects of the feature. While the experimental results may be used to predict user response to a particular experiment (e.g., by modeling with user embeddings), as discussed above, these are generally not effectively generalizable to other experiments or modifications.

SUMMARY

In accordance with one or more aspects of the disclosure, an embedding model learns to generate a user embedding for a user based on experimental results from a plurality of experiments (e.g., at least from results of a first experiment and a second experiment). The user embedding is trained to characterize the user with respect to information that may be predictive of conditional treatment effect for the user. The conditional treatment effect describes the extent to which one or more measured outcomes of an experiment are expected to be changed by different experimental treatments or conditions. For example, one user may generally be insensitive to treatment modifications, such that the user is expected to typically perform the same behaviors across different treatments (e.g., for different experiments). Another user may generally be very sensitive to different treatment modifications, such that in different experimental conditions, that user may have significantly higher variability in response. By learning such user embeddings jointly with multiple experiments and learning with respect to conditional treatment effects, the user embeddings are more effectively translated to other applications (e.g., other experiments or as a features input to other processing decisions), enabling other applications to benefit from the learned information of the user embeddings representing the way in which different users may be responsive to different processes.

To learn effective user embeddings that can more generally represent conditional treatment effects, user embeddings are generated by an embedding model with parameters trained based on a plurality of experiments based on the conditional treatment effect of each experiment. The data associated with each experiment may include individual users participating in the experiment along with the treatment conditions for the experiment. The generation of user embeddings by the embedding model is jointly trained with models that predict information with respect to each of the experiments. Each experiment may be associated with an experimental effect prediction model that receives the user embedding as an input and may predict a conditional effect of an experimental treatment for the user. In some embodiments, the experimental effect prediction model may thus operate as a decoder with respect to the user feature encoding by the embedding model. Losses for each of the experiment-related models may then be propagated to the embedding model to improve the user embeddings via updates to the embedding model parameters.

To train the embedding model with respect to the conditional treatment effects, the conditional treatment effect for individual users is estimated for the subject experiments. The "ground truth" or "training" data to determine a loss with respect to a user's conditional treatment effect (e.g., for a participant in the experiment) may be determined by comparing the user's actual outcome in the experiment to a predicted counterfactual outcome for the user. As such, in one example, a counterfactual model of the experimental results may be used to predict counterfactual outcome value(s) for a user for a given treatment based on users who experienced that treatment in the experiment. The different outcomes (experienced and counterfactual) may then be used to determine the treatment effect (i.e., an effect attributable to the treatment) of the user for the experiment.

Predictions by an experimental effect prediction model for the experiment may then be compared to the determined treatment effect from the experimental results to generate a loss for the experimental effect prediction model with respect to that experiment (that may then be propagated to the embedding model). This approach enables the embedding model to learn parameters for creating user embeddings that are effective for evaluating user-level variability in treatment effect prediction. The user embeddings may then be stored and used by other models as features (or further fine-tuning the embedding model), more effectively predicting user response variance by these models with reduced training time.

One or more embodiments of the technology described herein thus accelerate the time to launch new targeting algorithms by reducing or outright eliminating feature-engineering work, which can be the most resource-consuming component of training and deploying targeting algorithms based on heterogeneous treatment effects. Moreover, one or more embodiments further reduce reliance on large, resource-consuming training data generation cycles by incorporating knowledge acquired in past experiments in the embeddings (e.g., transfer learning). New models may thus merely need to learn the weights on the embeddings, instead of learning the embeddings from scratch.

DETAILED DESCRIPTION

Figure 1:
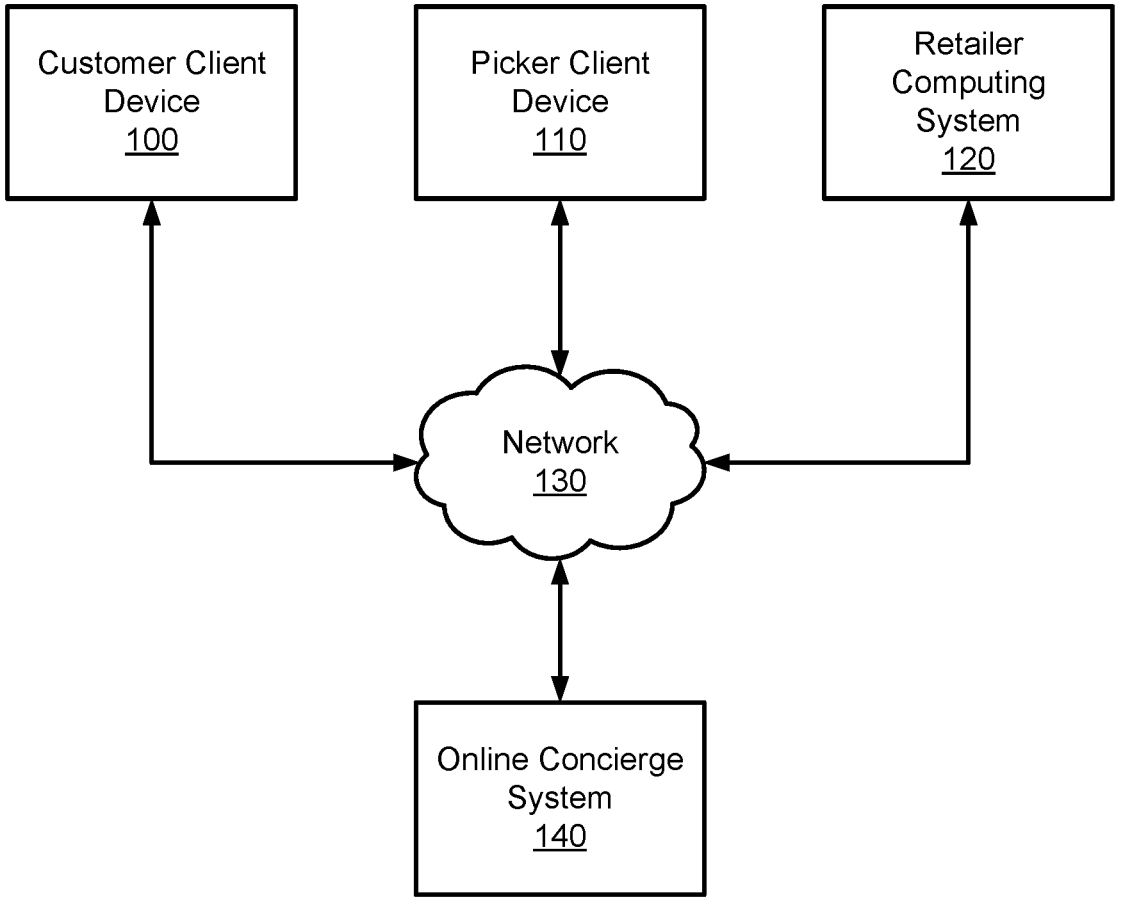
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In the discussion below, an online concierge system 140 is an example system in which modifications of processes and aspects of interactions with users may be performed as various "experiments" for the generation of user embeddings that may represent users for characterizing different users' conditional treatment effect. These user embeddings may then be used for predicting responses to further conditions by the users. The online concierge system 140 may perform or receive experimental results for one or more experiments in which a condition was modified between groups of users. The particular set of conditions for each group of users is referred to as a treatment or a variant. A conditional treatment effect describes the extent to which a particular user's characteristics, actions, or behaviors (i.e., one or more measured outcomes of the experiment) change, or are expected to change, when the condition is modified. Stated another way, the conditional treatment effect describes the extent to which outcomes for a user are expected to differ for one experimental treatment compared to another. The online concierge system 140 is discussed herein as one example system in which such experiments may be performed, and for which related user embeddings are generated. However, these principles are applicable to other types of systems in which experiments may be performed and users may be characterized according to the different conditional treatment effects. As such, additional embodiments may determine user embeddings (and related embedding models as discussed below) in other contexts and with respect to different types of systems that users may interact with.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
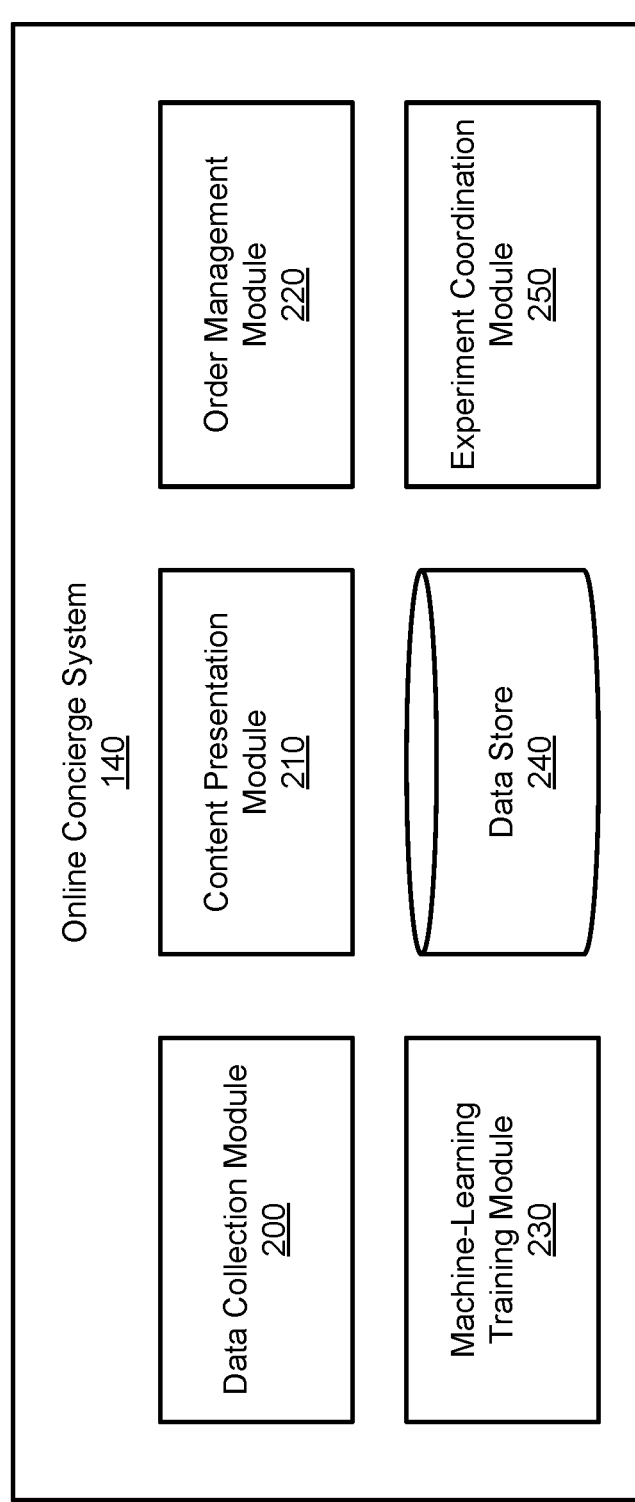
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and an experiment coordination module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. A machine-learning model may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that comprises the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the set of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data and may use databases to organize the stored data.

The experiment coordination module 250 coordinates execution and analysis of experiments conducted by the online concierge system 140. As noted above, various aspects of the online concierge system 140 may be modified to evaluate modifications to various processes of the online concierge system 140. The experiments performed by the experiment coordination module 250 may represent data collected for groups of users experiencing different sets of conditions. A set of such conditions may be referred to as a treatment or variation. In many cases, the efficacy, value, or other benefit or detriment for how the online concierge system 140 operates with respect to different variations may be determined through the way that users respond to such variations. Performing these experiments with respect to different user groups provides a way for the online concierge system 140 to assess the effects of different modifications to its processes that otherwise cannot be known before the experiment. For example, an experiment may modify how items are selected for or presented to users in a display or a sequence of interfaces for placing an order with the online concierge system 140. Such experiments may be performed with respect to various types of users, including customers placing orders as well as pickers retrieving and delivering orders. As discussed above, embodiments may relate to various experiments, types of users, and different types of systems, such as different systems from the online concierge system 140.

The experiment coordination module 250 may coordinate with respective modules to perform the experiment by determining which users receive different treatments and how to implement the different experimental variants. These differ according to the particular experiment and in different configurations. For example, an experiment may vary the way in which content is selected and presented to users, such that the operation of the content presentation module 210 is performed in one way for one group of users and another way for another group of users. Users may be assigned to groups associated with each of the treatments, e.g., randomly or by other means, and results collected for the users after receiving the experimental treatment. The results of an experiment may be stored in the data store 240 describing the experimental treatments, which users were associated with which treatment, and the outcomes associated with that user. An outcome for an experiment is any measurable result of the experiment that may be measured and associated with the different treatments and may vary in different embodiments. As one example, an outcome may be the average number of orders placed by a customer in a month, the average size of orders, total value of orders in a month, total number of interactions with the online concierge system 140, and so forth.

In addition to specifically orchestrated experiments, in some examples, the data store 240 may also store information related to "natural" experiments relating to situations in which conditions are modified without specific orchestration by the experiment coordination module 250. For example, when a particular item or group of items is out of stock or otherwise unavailable to order, this may create a modified treatment relative to "normal" conditions in which that item or group of items is in-stock. Users may behave differently relative to these conditions. For example, users placing orders may change their ordering frequency or order patterns or select (or not select) substitute items in response. Data related to these "natural" experiments may be identified and stored with respect to users subjected to each set of conditions as different experimental treatments experienced by each group of users (in this example, one group in which the item(s) was available and another group in which the item(s) were not available). In some embodiments, the experiment coordination module 250 may identify when such different conditions occur that represent these "natural" experiments and characterize users with respect to the different treatments as experimental data in the data store 240.

The experiment coordination module 250 in conjunction with the machine-learning training module 230 may coordinate training of models describing a user's likely conditional treatment effect for one or more experiments. As discussed below, particularly with respect to FIG. 4, an embedding model may be trained with respect to multiple experiments to learn to generate a user embedding that represents the user for effective prediction of that user's conditional treatment effect across multiple experiments. This user embedding may then be used as an input to represent the user with other models and enable more effective training of further models predicting user response to differing treatments.

Figure 3:
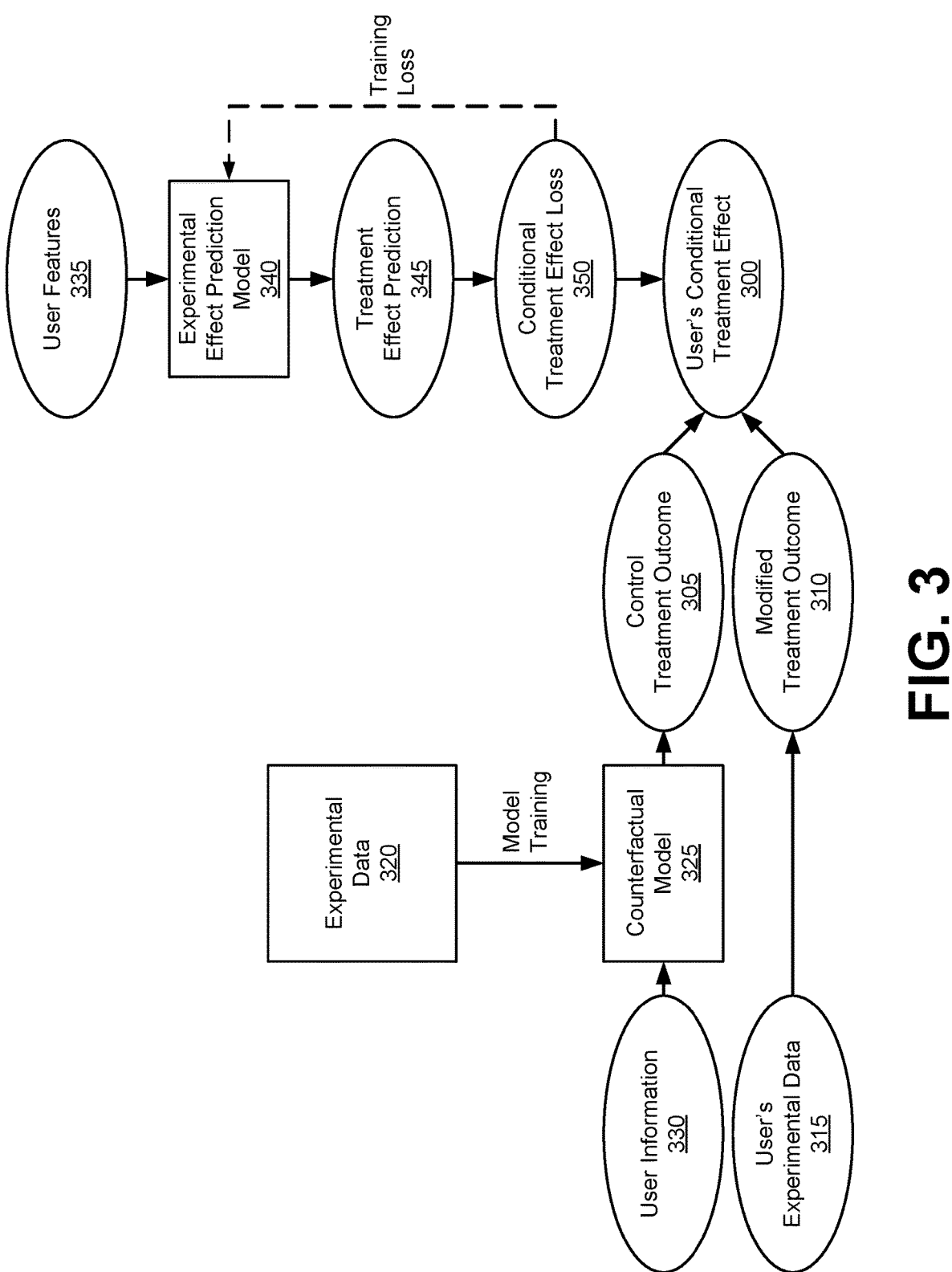
FIG. 3 is an example for determining a user's conditional treatment effect and applying the conditional treatment effect to train an experimental effect prediction model, in accordance with one or more embodiments.

FIG. 3 is an example for determining a user's conditional treatment effect 300 and applying the conditional treatment effect to train an experimental effect prediction model 340, in accordance with one or more embodiments. The example of FIG. 3 shows an example of determining a user's conditional treatment effect for training a model for that experiment. As discussed with respect to FIG. 4, similar principles may be applied for multiple experiments to learn parameters of a jointly trained embedding model.

In the example of FIG. 3, a user's conditional treatment effect 300 is based on the difference between a control treatment outcome 305 and a modified treatment outcome 310. In this example, the control treatment may represent a standard or current set of processes, and the modified treatment may represent a variation being tested by the experiment. In many cases, each user associated with an experiment may be associated with a single treatment in the experiment. For example, the experiment may be performed for a month, and the outcome may be measured by user interactions within that month. For a given month, a user may only experience one treatment. As such, in many cases, the conditional treatment effect may be estimated based on the likely outcome if the user had experienced the other treatment. Treatments that were not experienced by a user in an experiment (and for which outcomes may be estimated) may be termed "counterfactual" treatments. In this example, the user was subject to the modified treatment, such that the user's experimental data 315 may be directly used as the modified treatment outcome 310 for that user, and the control treatment outcome 305 is a predicted outcome for a counterfactual treatment with the control treatment for this user.

To determine the user's conditional treatment effect 300, the experimental data 320 may be analyzed with respect to other users in the experiment to predict the likely control treatment outcome 305 (i.e., to predict the counterfactual treatment outcome, which in this case is the control treatment). In general, the similarity of the user to the group of users that did experience the treatment to be predicted may be used to predict the likely conditional treatment effect (e.g., the control treatment outcome) for the user. In FIG. 3, the control treatment outcome 305 may be predicted by a counterfactual model 325 that learns to predict a control treatment outcome based on information about users. In particular, user information 330 about the users in the experiment associated with the counterfactual treatment along with associated outcomes may be used to train parameters of a counterfactual model 325 to predict the control treatment outcome 305. The counterfactual model 325 in this example is trained to predict the control treatment outcome 305, from which the user's conditional treatment effect 300 may be determined by applying the user's user information 330 to the counterfactual model 325. In further embodiments, the counterfactual model 325 may estimate the conditional treatment effect in other ways without explicitly calculating a treatment outcome for the user. The user's conditional treatment effect 300 may be a difference between the respective treatment outcomes and may be determined as an absolute (a specific value) or relative value (e.g., as a percentage change) or in other ways in various embodiments. In some embodiments, the determination of the user's conditional treatment effect 300 is based on inverse propensity sampling (IPS) of the user's experimental data 315 and/or experimental data 320.

The user's conditional treatment effect 300 may then be used as a training label for predictions of an experimental effect prediction model 340. The experimental effect prediction model 340 may receive a set of user features 335 for a user and apply parameters of the experimental effect prediction model 340 to generate a treatment effect prediction 345 for a user. For example, a particular user who participated in an experiment may have that user's conditional treatment effect 300 determined based on the experimental data 320 as discussed above. A set of user features 335 describing the user is input to the experimental effect prediction model 340 to generate a treatment effect prediction 345. A conditional treatment effect loss 350 is determined by comparing the treatment effect prediction 345 with the user's conditional treatment effect 300. The conditional treatment effect loss 350 may then be used during training to modify parameters of the experimental effect prediction model 340 to reduce the loss with respect to that user. FIG. 3 shows an example of training a single experimental effect prediction model 340 based on the user's conditional treatment effect. To further generalize the model and represent a user with respect to several types of experiments, along with the likely conditional response from different users, user embeddings may be generated based on conditional treatment effect losses from a plurality of different experiments.

Figure 4:
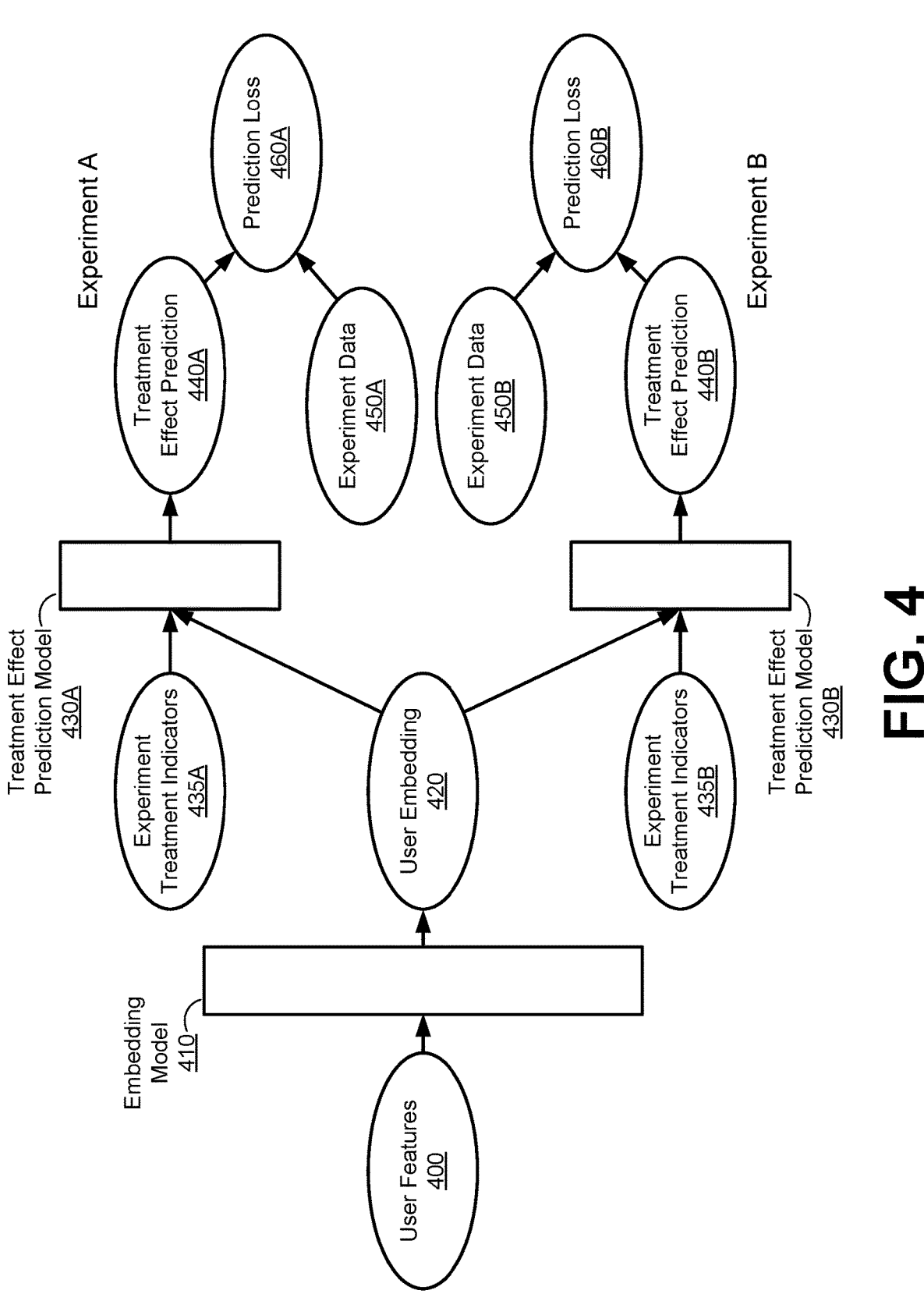
FIG. 4 shows an example architecture for training an embedding model for user embeddings based on conditional effect treatment of multiple experiments, in accordance with one or more embodiments.

FIG. 4 shows an example architecture for training an embedding model 410 for user embeddings based on conditional effect treatment of multiple experiments, in accordance with one or more embodiments. In this example two experiments are shown, designated A and B in the figures, although any number of experiments may be used in practice. In general, the embedding model 410 receives a set of user features 400 and learns parameters of the embedding model 410 for a resulting user embedding 420 that is co-trained with respect to multiple treatment effect prediction models 430A, B. A user embedding 420 may then be used by other models to represent characteristics relevant to a user's conditional treatment effect. That is, the user embedding 420 generated by the embedding model 410 describes aspects of the user in values of the user embedding that may be used to characterize a user's conditional treatment effect.

As user embeddings for different users may be generated by the embedding model 410 according to their respective user features, a set of user embeddings 420 may thus characterize the different users differently, enabling heterogeneous representation and evaluation of the different users and user-specific characterization of conditional treatment effects. Stated another way, a latent space may thus include information describing "what causes a user to act" (i.e., aspects that may be interpreted to describe how and when different conditions modify user behavior) rather than directly predictive of a user outcome. Two users with significantly different outcome values may have similar user embeddings if the two users respond similarly to different treatments of the same experiment. Thus, for a measured outcome of "orders per month," as an example, a first user with 5 orders in a first treatment that increases to 10 orders in a second treatment (a conditional treatment effect describing a relative 100% increase) may have a similar representation as a second user with 100 orders in the first treatment and 195 orders in the second treatment (a conditional treatment effect describing a similar 95% increase). Although these users have very different outcome values (5 and 100 in the first treatment and 10 and 195 in the second treatment), the relative conditional effect is similar. As a further example, a third user may have an outcome value of 50 orders in the first treatment and 55 orders in the second treatment, representing a much lower conditional treatment effect of a 10% relative increase when compared to the first and second users. By generating embeddings that describe the relative effect of different treatments on users, this enables the embeddings to capture characteristics that describe the relative change for these users rather than predicting outcome values directly.

The structure of the user features 400, embedding model 410, and the user embedding 420 may differ in various embodiments. The user features 400 may describe various aspects of a user according to the particular application of the system. In an online concierge system, users may be described in the user features 400 based on various information such as order history, order frequency, location, locations from which the user orders, and so forth. The particular user features 400 may also depend on the context in which the experiments are performed. For example, in one or more embodiments, the experiments relate to information associated with user sign-ups and initial ordering with the online concierge system. This may be used, for example, with experiments evaluating different signup order processes, interfaces (e.g., interface sequencing), promotions, initial item selection and recommendation, and other relevant processes and algorithms. In this example, the user features 400 may include information such as a user's operating system, device type, browser type (e.g., a user agent), location information (e.g., as derived from an IP address or otherwise), email provider, time or day of week that a user accesses the system, and so forth. In other configurations, the user features 400 may include additional or different information according to the particular application of the user embeddings and related features available for users.

The embedding model 410 may function as an encoder, such that the user features 400 are "encoded" to a characterization in the user embedding 420. The user embedding 420 may be a set of values in a plurality of dimensions, e.g., as a position in a latent space. In this example, the output of the embedding model 410 may be continuous with respect to the possible output space of the user embeddings 420 (e.g., continuous in the latent space characterized by values in the plurality of dimensions). In other embodiments, the user embedding 420 is a discretized embedding, such that each position in the embedding may describe a particular "category" as a Boolean value. In some embodiments, the "categories" may be latent, such that the categories describe aspects of users without specific labels and may be learned characterizations of users.

The particular architecture of the embedding model 410 may thus vary in different embodiments and may be selected according to the particular structure of the user embedding 420. For example, a neural network including a plurality of layers (e.g., fully connected layers, activation layers, etc.) may be used to generate user embeddings describing a position in latent space. As another example, to generate discretized embeddings, a tree-based encoder may be used, in which leaves of the tree correspond to discrete categories/ category values.

During training, parameters of the embedding model 410 are trained in conjunction with multiple treatment effect prediction models, e.g., one for each of the experiments. In the example of FIG. 4, losses may be passed through to train the parameters of the embedding model 410 from either treatment effect prediction model 430A, B. For example, with respect to the first experiment, a prediction loss 460A may be generated based on experimental data 450A that relates to the first experiment, and a treatment effect prediction 440A from parameters of the treatment effect prediction model 430A. The prediction loss 460A may include a conditional treatment effect loss as discussed with respect to FIG. 3, for example, describing the difference in conditional treatment effect between the treatment effect prediction model 430A and the experimental data 450A (and may include generating any related counterfactual outcome predictions for the user).

In some embodiments, the treatment effect prediction model may predict individual outcomes, from which the treatment effect prediction may be determined, and a related loss generated. To do so, in some embodiments, the treatment effect prediction model 430A, B may receive an additional input, an experiment treatment indicator 435A, B designating the treatment for a particular application of the treatment effect prediction model. The treatment effect prediction model 430A, B in other embodiments, an experiment may use several different treatments to be compared with a control treatment, such that the experiment treatment indicator 435A, B may designate the particular treatment to be compared with the control treatment. For example, the control treatment may represent a null or current process, and the additional treatments represent different variations of the current process.

A conditional treatment effect loss is thus generated for the prediction loss 460A from the prediction(s) of the treatment effect prediction model 430A, e.g., similar to the discussion with respect to FIG. 3. The prediction loss for the first experiment may then be applied to modify parameters of the respective treatment effect prediction model 430A and further propagated to modify parameters of the embedding model 410. Thus, a first user belonging to the first experiment may have a conditional treatment effect determined based on the experimental data 450A, and a prediction loss 460A of the treatment effect prediction model 430A is generated based on applying the embedding model 410 to the user's user features 400 and applying the generated user embedding 420 of that user to the treatment effect prediction model 430A based on its current parameters. The prediction loss 460A is then used to train parameters of the treatment effect prediction model 430A and the embedding model 410. The training loss may be applied via any suitable means depending on the particular model architectures. These may include, for example, parameter updates based on a gradient descent or other suitable algorithm for reducing a loss according to model parameters. In addition to the first user, additional users associated with the first experiment may also be similarly processed (e.g., in a batch) and applied to update the model parameters.

Similarly, users associated with the second experiment may have a respective prediction loss 460B generated with respect to experimental data 450B associated with the second experiment. For example, a second user of the second experiment may have respective user features 400 applied to the embedding model 410 to determine a respective user embedding 420 for the second user and applied to the treatment effect prediction model 430B for generating a treatment effect prediction 440B for which the prediction loss 460B is determined. This loss may then be used to train parameters of the treatment effect prediction model 430B and embedding model 410. In this way, the treatment effect prediction models 430A, B may each operate as separate decoders based on the encoded information in the user embedding 420, such that the embedding model 410 learns parameters for generating user embeddings 420 that jointly reduce conditional effect prediction errors for each of the experiments. In some embodiments, the number of users (i.e., training data instances) used to train the embedding model (e.g., in a particular batch) is evenly selected from the experiments. In one or more embodiments, the loss may be aggregated or weighted across users before determining parameter updates (e.g., as specific gradients) to be applied to the respective models.

In one or more embodiments, the user embeddings may also be modified to debias the embeddings with respect to one or more sensitive characteristics of the user. These sensitive characteristics may include information about a user that either should not form the basis of a prediction, or for which the characteristic should not be determinable based on the user embedding 420. The user embeddings may be debiased in various ways in different embodiments. In one configuration, the loss function for the prediction loss 460A and/or prediction loss 460B includes a component for penalizing bias in the user embedding 420, discouraging the user embedding 420 from including such bias. This component may be included with the prediction loss 460A, B or as an additional aspect for determining model parameter updates when updates are propagated from the treatment effect prediction model 430A, B to the embedding model 410. This debiasing loss may be determined in one example based on an adversarial model trained to predict the sensitive feature based on the user embedding as an input, such that the loss function penalizes the successful prediction of the sensitive user characteristic by the adversarial model based on the user embedding. As another example for debiasing the user embeddings, the sensitive features may be residu- alized in the generated user embeddings, such that the initial modeling is trained to remove or reduce influence from the sensitive user features.

As noted above, the measured outcomes for which the conditional treatment effect is determined may be any suit- able measured outcome for the experiment. In one or more embodiments, the outcome used for the treatment effect prediction model is a combination of measured outcomes and may be weighted. As additional examples, particular portions of the user embedding may also be associated with conditional treatment effects of different types of outcomes. For example, for a user embedding having 300 dimensions, the first 100 dimensions may be used with respect to a first outcome, the next 100 dimensions for a second outcome, and the third 100 dimensions for a third outcome. This may enable the user embedding as a whole to represent different types of characteristics that may influence conditional treat- ment effects for different outcomes.

As noted above, by training the embedding model with individual user embeddings and doing so for multiple experiments, the generated user embeddings may individu- ally reflect heterogeneous aspects of different users with respect to information that changes user behaviors (e.g., that conditionally modify their outcomes). For a broader set of users of the system (e.g., users of the online concierge system 140), respective user embeddings 420 are generated (after training the embedding model 410) by applying each user's user features 400 to the embedding model 410. These user embeddings may then be stored and used for a variety of further purposes. For example, the generated user embed- dings may be used as a feature for further predictive models.

Figure 5:
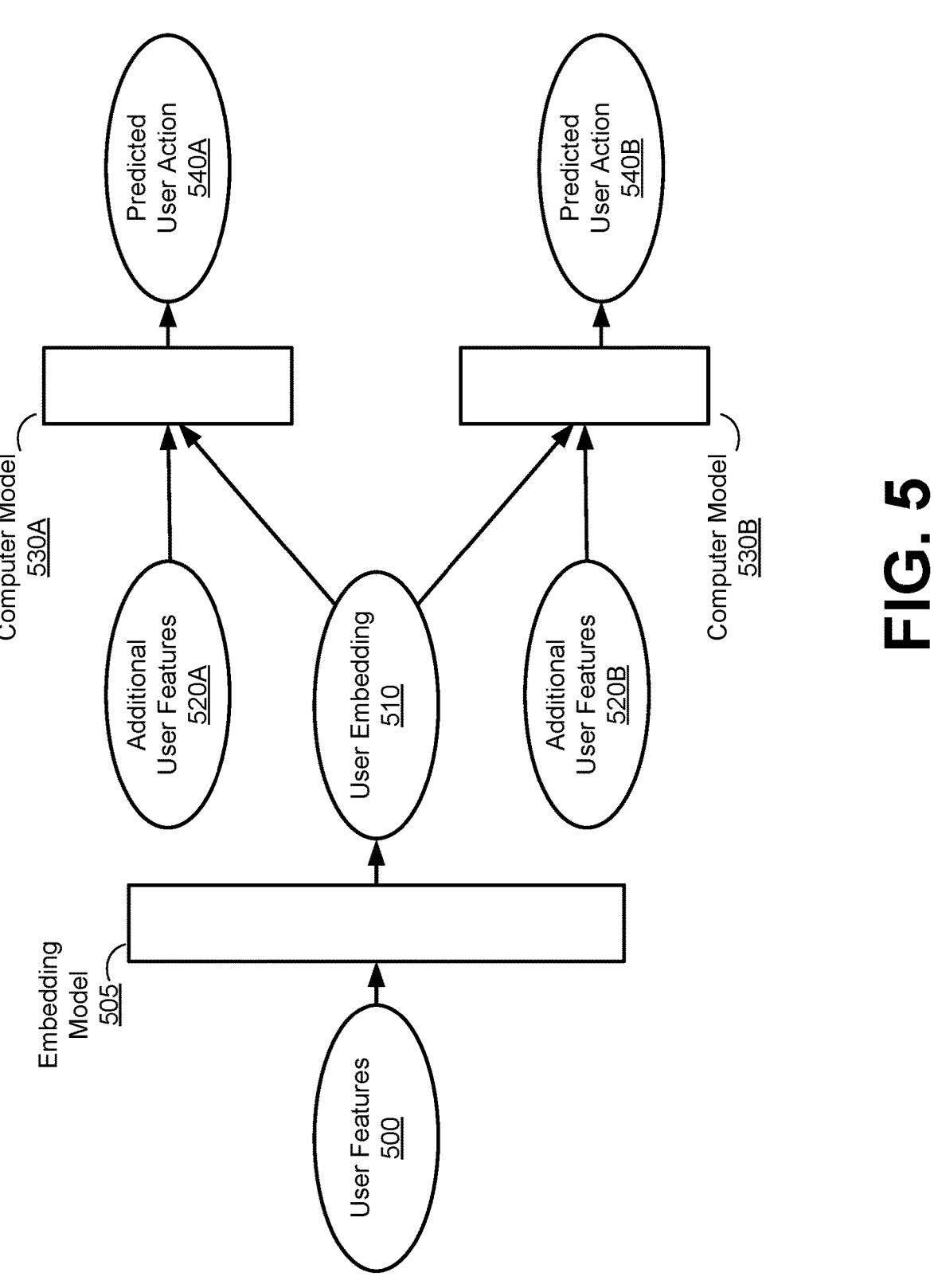
FIG. 5 shows an example of applying user embeddings for additional model predictions, in accordance with one or more embodiments.

FIG. 5 shows an example of applying user embeddings for additional model predictions, in accordance with one or more embodiments. For each user, a set of user features 500 is applied to an embedding model 505 to generate a respec- tive user embedding 510 for the user. These user embed- dings may be stored as just discussed. The embedding model 505 may be the trained embedding model discussed above with respect to FIG. 4, such that its parameters may be trained with respect to the conditional treatment effect for various experiments. As just discussed, such user embed- dings 510 may be stored and may then be used for additional computers such as computer models 530A, B. In this example, the user embedding 510 may operate as one feature representing a user as an input to the respective computer models 530A, B optionally with additional user features 520A, B. The computer models 530A, B may then generate predicted user actions 540A, B based on the input features, including the user embedding 510. These predictions may represent further outcomes or other characteristics predict- able from the user embeddings that are different from the experiments performed to train the models (e.g., may differ from the experimental treatments discussed with respect to FIG. 4). The computer models 530A, B may have param- eters trained based on the user embedding 510 as an input, such that the computer models learn to predict further user actions or user characteristics based on the conditional treatment effect information stored in the user embedding 510. As the user embedding 510 describes characteristics of a user with respect to conditional treatment effect, the computer models 530A, B may more effectively learn parameters describing different responses from users with less training data, as significant user-response data may already be represented in the user embeddings.

In addition, in some embodiments, the further computer models may also fine-tune the characteristics of the user embeddings 510 and parameters of the embedding model 505 to improve the user embeddings for a particular predic- tion. In this configuration, the computer model may further refine parameters of the trained embedding model param- eters based on a loss function for the computer model prediction.

Distillation

In one or more embodiments, the user embeddings of FIG. 4 may be used to train a further computer model that distills parameters of the embedding model into a reduced- complexity model. In this application, the user embeddings may be used as a target output for training the reduced- complexity model, such that the information of the embed- ding model is a "teacher" to the reduced-complexity model that intends to learn the same outputs with reduced input. The reduced-complexity model may also use different or reduced user input features relative to a full-size embedding model, enabling effective user embedding generation with fewer features. In some embodiments, the reduced-complex- ity model and its user embedding outputs may be used as the embedding model 505 and user embeddings 510.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more com- puter-readable media that, individually or together, comprise instructions that, when executed by one or more processors, cause the one or more processors to perform, individually or together, the steps of the instructions stored on the one or more computer-readable media. Similarly, a processor com- prises one or more processors or processing units that, individually or together, perform the steps of instructions stored on a computer-readable medium.

Embodiments may also relate to a product that is pro- duced by a computing process described herein. Such a product may store information resulting from a computing process, where the information is stored on a non-transitory, tangible computer-readable medium and may include any embodiment of a computer program product or other data combination described herein.

The description herein may describe processes and sys- tems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example; comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
    determining a first conditional treatment effect for a first user with respect to a first experiment based on experimental results of the first experiment;
    determining a second conditional treatment effect for a second user with respect to a second experiment based on experimental results of the second experiment;
    training parameters for an embedding model comprising an encoder for encoding user features into a user embedding as an encoded characterization of the user features, wherein training the parameters for the embedding model is based on a first loss from a first decoder associated with the first experiment and a second loss from a second decoder associated with the second experiment, the first loss based on a first prediction for the first user relative to the first conditional treatment effect and the second loss based on a second prediction for the second user relative to the second conditional treatment effect;
    generating a set of user embeddings indicative of conditional treatment effect by applying the trained parameters of the embedding model to user features of a set of users; and storing the set of user embeddings in association with the respective users of the set of users.

2. The method of claim 1, further comprising:
    predicting a subject user's treatment effect for a treatment different from the first experiment and the second experiment based on one or more of the set of user embeddings associated with the subject user.

3. The method of claim 1, further comprising:
    training a set of computer model parameters for predicting a user action in which a user embedding of the set of user embeddings is an input feature.

4. The method of claim 1, wherein at least one of the first loss and the second loss include a loss term that debiases parameters of the embedding model with respect to a prediction of one or more sensitive user features.

5. The method of claim 1, wherein generating the set of user embeddings comprises generating categorical embeddings.

6. The method of claim 1, wherein training parameters for the embedding model comprises training parameters for a neural network.

7. The method of claim 1, wherein training parameters for the embedding model comprises training parameters for a tree-based encoder.

8. The method of claim 1, further comprising:
    training a distilled embedding model to predict a distilled user embedding trained with respect to a loss relative to the set of user embeddings.

9. The method of claim 1, wherein determining the first conditional treatment effect for the first user comprises:
    determining the first conditional treatment effect for the first user based on experimental data results of the first user subjected to a treatment condition in the first experiment and predicted data results for the first user subjected to a counterfactual treatment condition in the first experiment.

10. The method of claim 9, further comprising:
    predicting the first prediction for the first user based on a set of users subjected to the counterfactual treatment condition in the first experiment.

11. A computer program product comprising a non-transitory computer readable storage medium having instructions encoded thereon that, when executed by a processor, cause the processor to perform steps comprising:
    determining a first conditional treatment effect for a first user with respect to a first experiment based on experimental results of the first experiment;
    determining a second conditional treatment effect for a second user with respect to a second experiment based on experimental results of the second experiment;
    training parameters for an embedding model comprising an encoder for encoding user features into a user embedding as an encoded characterization of the user features, wherein training the parameters for the embedding model is based on a first loss from a first decoder associated with the first experiment and a second loss from a second decoder associated with the second experiment, the first loss based on a first prediction for the first user relative to the first conditional treatment effect and the second loss based on a second prediction for the second user relative to the second conditional treatment effect;
    generating a set of user embeddings indicative of conditional treatment effect by applying the trained parameters of the embedding model to user features of a set of users; and

storing the set of user embeddings in association with the respective users of the set of users.

12. The computer program product of claim 11, wherein the instructions further cause the processor to perform steps comprising: predicting a subject user's treatment effect for a treatment different from the first experiment and the second experiment based on one or more of the set of user embeddings associated with the subject user.

13. The computer program product of claim 11, wherein the instructions further cause the processor to perform steps comprising:

training a set of computer model parameters for predicting a user action in which a user embedding of the set of user embeddings is an input feature.

14. The computer program product storage of claim 11, wherein at least one of the first loss and the second loss include a loss term that debiases parameters of the embedding model with respect to a prediction of one or more sensitive user features.

15. The computer program product of claim 11, wherein generating the set of user embeddings comprises generating categorical embeddings.

16. The computer program product of claim 11, wherein training parameters for the embedding model comprises training parameters for a neural network.

17. The computer program product of claim 11, wherein training parameters for the embedding model comprises training parameters for a tree-based encoder.

18. The computer program product of claim 11, wherein the instructions further cause the processor to perform steps comprising:

training a distilled embedding model to predict a distilled user embedding trained with respect to a loss relative to the set of user embeddings.

19. The computer program product of claim 11, wherein determining the first conditional treatment effect for the first user comprises:

determining the first conditional treatment effect for the first user based on experimental data results of the first user subjected to a treatment condition in the first experiment and predicted data results for the first user subjected to a counterfactual treatment condition in the first experiment.

20. A computer system comprising:

a processor; and a non-transitory computer-readable storage medium storing instructions that, when executed by the processor, cause the processor to perform actions comprising:

determining a first conditional treatment effect for a first user with respect to a first experiment based on experimental results of the first experiment;

determining a second conditional treatment effect for a second user with respect to a second experiment based on experimental results of the second experiment;

training parameters for an embedding model comprising an encoder for encoding user features into a user embedding as an encoded characterization of the user features, wherein training the parameters for the embedding model is based on a first loss from a first decoder associated with the first experiment and a second loss from a second decoder associated with the second experiment, the first loss based on a first prediction for the first user relative to the first conditional treatment effect and the second loss based on a second prediction for the second user relative to the second conditional treatment effect;

generating a set of user embeddings indicative of conditional treatment effect by applying the trained parameters of the embedding model to user features of a set of users; and storing the set of user embeddings in association with the respective users of the set of users.

* * * * *